US 12,446,957 B2

United States Patent
McCarthy

(10) Patent No.: US 12,446,957 B2
(45) Date of Patent: Oct. 21, 2025

(54) ABLATION DEVICE FOR ATTACHMENT TO AN ENDOSCOPE

(71) Applicant: Cook Medical Technologies LLC, Bloomington, IN (US)

(72) Inventor: Dillon McCarthy, Bearnafunshin (IE)

(73) Assignee: COOK MEDICAL TECHNOLOGIES LLC, Bloomington, IN (US)

( * ) Notice: Subject to any disclaimer, the term of this patent is extended or adjusted under 35 U.S.C. 154(b) by 482 days.

(21) Appl. No.: 17/952,854

(22) Filed: Sep. 26, 2022

(65) Prior Publication Data
US 2023/0157749 A1    May 25, 2023

Related U.S. Application Data

(60) Provisional application No. 63/281,951, filed on Nov. 22, 2021.

(51) Int. Cl.
| A61B 1/00 | (2006.01) |
| A61B 1/015 | (2006.01) |
| A61B 1/04 | (2006.01) |
| A61B 18/14 | (2006.01) |
| A61B 17/00 | (2006.01) |
| A61B 18/00 | (2006.01) |

(52) U.S. Cl.
CPC .......... *A61B 18/1492* (2013.01); *A61B 1/015* (2013.01); *A61B 1/04* (2013.01); *A61B 2017/00336* (2013.01); *A61B 2018/00577* (2013.01); *A61B 2218/007* (2013.01)

(58) Field of Classification Search
CPC ....... A61B 1/015; A61B 1/04; A61B 1/00087; A61B 1/00098; A61B 2218/007
See application file for complete search history.

(56) References Cited

U.S. PATENT DOCUMENTS

| 6,514,250 | B1 | 2/2003 | Jahns et al. |
| 7,052,491 | B2 * | 5/2006 | Erb .................. A61B 18/18 |
| | | | 606/17 |
| 7,097,644 | B2 | 8/2006 | Long |
| 7,344,535 | B2 | 3/2008 | Stern et al. |
| 8,353,907 | B2 | 1/2013 | Winkler et al. |
| 8,545,497 | B2 | 10/2013 | Morrissey et al. |

(Continued)

FOREIGN PATENT DOCUMENTS

| WO | WO 2000/66019 | 11/2000 |
| WO | WO 2007/011634 A1 | 1/2007 |

OTHER PUBLICATIONS

Extended European Search Report in European Patent Application No. 22 208 947.6 dated Apr. 3, 2023, 5 pages.

*Primary Examiner* — Timothy J Neal
(74) *Attorney, Agent, or Firm* — Vivacqua Crane, PLLC

(57) ABSTRACT

An ablation device including a body having a lumen for receiving a distal end of an endoscope, a cover portion extending from a side of the body, the cover portion defining a recess between the cover portion and the body, and an electrode platform having at least one electrode positioned thereon, the electrode platform movable between a covered position, where the at least one electrode is covered by the cover portion, and an exposed position, where the at least one electrode is at least partially exposed beyond the cover portion. At least one vacuum port is formed in the electrode platform.

20 Claims, 8 Drawing Sheets

(56) References Cited

U.S. PATENT DOCUMENTS

| | | |
|---|---|---|
| 8,998,897 B2 | 4/2015 | Binmoeller et al. |
| 9,168,087 B2 | 10/2015 | Davison et al. |
| 9,283,032 B2 * | 3/2016 | Thomas ............... A61B 18/148 |
| 10,420,600 B2 | 9/2019 | Taft |
| 2002/0052600 A1 | 5/2002 | Davison et al. |
| 2003/0181900 A1 | 9/2003 | Long |
| 2006/0069313 A1 * | 3/2006 | Couvillon, Jr. .......... A61B 5/06 |
| | | 600/179 |
| 2009/0270856 A1 * | 10/2009 | Saadat ............... A61B 17/0401 |
| | | 606/41 |
| 2012/0053403 A1 | 3/2012 | Ducharme et al. |
| 2013/0046300 A1 | 2/2013 | Binmoeller et al. |
| 2015/0088121 A1 | 3/2015 | Ducharme et al. |
| 2020/0352416 A1 * | 11/2020 | McLawhorn ...... A61B 1/00087 |

\* cited by examiner

ABLATION DEVICE FOR ATTACHMENT TO AN ENDOSCOPE

RELATED APPLICATION

This application claims the benefit of U.S. Provisional Application No. 63/281,951, filed Nov. 22, 2021, the entirety of which is herein incorporated by reference.

TECHNICAL FIELD

The present disclosure generally relates to ablation devices for attachment to an endoscope, and more particularly, to ablation devices, with suction capabilities, for attachment to an endoscope.

BACKGROUND

Endoscopic devices and procedures may be used to diagnose, monitor and treat various conditions by close examination of the internal organs. By way of background, a conventional endoscope generally is an instrument having an imaging device for visualizing the interior of an internal region of a body and a lumen for inserting one or more treatment devices therethrough. A wide range of applications have been developed for the general field of endoscopes including by way of non-limiting example the following: arthroscope, angioscope, bronchoscope, choledochoscope, colonoscope, cytoscope, duodenoscope, enteroscope, esophagogastro-duodenoscope (gastroscope), laparoscope, laryngoscope, nasopharyngo-neproscope, sigmoidoscope, thoracoscope, and utererscope (individually and collectively, "endoscope").

By way of non-limiting example, millions of people suffer from progressive gastroesophageal reflux disease (GERD), which is characterized by frequent episodes of heartburn, typically on at least a daily basis. Without adequate treatment, GERD can cause erosion of the esophageal lining as the lower esophageal sphincter (LES), a segment of smooth muscle located at the junction of the stomach and the esophagus, gradually loses its ability to function as the barrier that prevents stomach acid reflux. Chronic GERD can also cause metaplasia to the inner lining of the esophagus where the normal squamous mucosa changes to columnar mucosa, also known as Barrett's esophagus. Barrett's esophagus can progress to esophageal cancer if left untreated.

Endoscopic treatment of Barrett's esophagus includes endoscopic mucosal resection (EMR). One method of performing EMR involves ablation of the mucosal surface by heating the surface until the surface layer is no longer viable. The dead tissue is then removed.

Treatment devices for performing EMR have been developed using bipolar ablation technology that includes attaching an ablation cap to the distal end of an endoscope, then positioning a probe associated with the cap against the target tissue and delivering energy to the tissue to ablate the tissue in contact with the probe. In some devices, as a safety precaution, if the probe does not make sufficient contact with tissue to be ablated, the probe may not be energized. Thus, to ensure adequate contact between the probe and the target tissue during the procedure, a vacuum associated with the endoscope may supply a suction force within the ablation cap in order to draw the tissue to be ablated into contact with the probe. A consequence of this suction force, however, is that tissue may be drawn into the cap, thereby blocking or obscuring direct endoscopic visualization (e.g., via the imaging device of the endoscope), thereby limiting or preventing accurate positioning of the probe for tissue ablation.

In other devices, a preset amount of energy may be delivered to the probe, regardless of the surface area of the probe in contact with tissue, relative to the surface area of the probe not in contact with tissue. In those situations, the amount of energy delivered to the tissue in contact with the probe may exceed a desired level, for example, as compared to the same amount of energy delivered to and distributed among tissue in contact with the entire surface area of the probe. Those situations may present additional safety or other operational concerns.

What is needed in the art is an ablation treatment device that is simple to use, that may be coupled to an endoscope, that minimizes the number of steps and time required for a treatment procedure, and that provides treatment under direct endoscopic visualization.

SUMMARY

The present embodiments provide systems and methods suitable for ablation treatment using an endoscope, while i) maintaining suitable visibility of the target treatment site and surrounding environment, and ii) supplying a vacuum or suction force to draw tissue to be ablated into contact with a probe.

In one aspect, an ablation device includes a body having a lumen for receiving a distal end of an endoscope, a cover portion extending from a side of the body, the cover portion defining a recess between the cover portion and the body, and an electrode platform having at least one electrode positioned thereon, the electrode platform movable between a covered position, where the at least one electrode is covered by the cover portion, and an exposed position, where the at least one electrode is at least partially exposed beyond the cover portion. At least one vacuum port is formed in the electrode platform.

The at least one vacuum port may include a plurality of vacuum ports arranged about a periphery of the electrode platform. The at least one vacuum port may include a plurality of vacuum ports arranged about a periphery of the at least one electrode. The at least one vacuum port may be surrounded by the at least one electrode. The at least one vacuum port may include a plurality of vacuum ports surrounded by the at least one electrode.

A vacuum port of the at least one vacuum port may be circular. A vacuum port of the at least one vacuum port may have a diameter of 1.0 to 1.5 mm, or less. A vacuum port of the at least one vacuum port may be square. A vacuum port of the at least one vacuum port may have a maximum dimension of 1.0 to 1.5 mm, or less. A vacuum port of the at least one vacuum port may be rectangular. A vacuum port of the at least one vacuum port may have a maximum width of 1.0 to 1.5 mm, or less. A vacuum port of the at least one vacuum port may be a longitudinal slot extending along a length of the at least one electrode. A width of the longitudinal slot may be between 1.0 to 1.5 mm, or less. A vacuum port of the at least one vacuum port may be a transverse slot extending along a width of the at least one electrode. A width of the transverse slot may be between 1.0 to 1.5 mm, or less. A vacuum port of the at least one vacuum port may include a longitudinal slot extending along a length of the at least one electrode, and a transverse slot extending along a width of the at least one electrode. A width of the longitudinal slot and the transverse slot may be between 1.0 to 1.5 mm, or less.

In some embodiments, a drive catheter extends proximally from the electrode platform. The drive catheter may include at least one lumen. At least one wire may extend from the at least one electrode through a lumen of the at least one lumen. A first lumen of the at least one lumen may be in fluid communication with a first vacuum port of the at least one vacuum port, and a second lumen of the at least one lumen may be in fluid communication with a second vacuum port of the at least one vacuum port.

In some embodiments, the electrode platform may include an internal cavity, the at least one vacuum port being in fluid communication with the internal cavity. A drive catheter may extend proximally from the electrode platform, the drive catheter having at least one lumen in fluid communication with the internal cavity.

The ablation device may include any one or more of the features above.

In another embodiment, an ablation device system includes an endoscope having an imaging device for capturing images at a distal end of the endoscope and one or more fluid lumens extending through at least a portion of the endoscope between a proximal end of the endoscope and the distal end. The system further includes an ablation cap with a body having a lumen for receiving the distal end of the endoscope, and a cover portion extending from a side of the body, the cover portion defining a recess between the cover portion and the body. An electrode platform includes at least one electrode positioned thereon, the electrode platform movable between a covered position, where the at least one electrode is covered by the cover portion, and an exposed position, where the at least one electrode is at least partially exposed beyond the cover portion. At least one vacuum port formed in the electrode platform.

The system may include at least one vacuum pump, wherein the at least one vacuum port formed in the electrode platform of the ablation cap and the one or more fluid lumens of the endoscope are in fluid communication with the at least one vacuum pump. The at least one vacuum pump may supply a suction force to the at least one vacuum port formed in the electrode platform of the ablation cap independent of a suction force supplied to the one or more fluid lumens of the endoscope.

In some embodiments, the at least one vacuum port may include a plurality of vacuum ports arranged about a periphery of the electrode platform. The at least one vacuum port may include a plurality of vacuum ports arranged about a periphery of the at least one electrode. The at least one vacuum port may be surrounded by the at least one electrode. The at least one vacuum port may include a plurality of vacuum ports surrounded by the at least one electrode.

In some embodiments, a vacuum port of the at least one vacuum port may be circular. A vacuum port of the at least one vacuum port may have a diameter of 1.0 to 1.5 mm, or less. A vacuum port of the at least one vacuum port may be square. A vacuum port of the at least one vacuum port may have a maximum dimension of 1.0 to 1.5 mm, or less. A vacuum port of the at least one vacuum port is rectangular. A vacuum port of the at least one vacuum port may have a maximum width of 1.0 to 1.5 mm, or less. A vacuum port of the at least one vacuum port may have a longitudinal slot extending along a length of the at least one electrode. A width of the longitudinal slot may be between 1.0 to 1.5 mm, or less. A vacuum port of the at least one vacuum port may be a transverse slot extending along a width of the at least one electrode. A width of the transverse slot may be between 1.0 to 1.5 mm, or less. A vacuum port of the at least one vacuum port may include a longitudinal slot extending along a length of the at least one electrode, and a transverse slot extending along a width of the at least one electrode. A width of the longitudinal slot and the transverse slot may be between 1.0 to 1.5 mm, or less.

In some embodiments, a drive catheter extends proximally from the electrode platform. The drive catheter may include at least one lumen. At least one wire may extend from the at least one electrode through a lumen of the at least one lumen. A first lumen of the at least one lumen may be in fluid communication with a first vacuum port of the at least one vacuum port, and a second lumen of the at least one lumen may be in fluid communication with a second vacuum port of the at least one vacuum port.

In some embodiments, the electrode platform may include an internal cavity, the at least one vacuum port being in fluid communication with the internal cavity. A drive catheter may extend proximally from the electrode platform, the drive catheter having at least one lumen in fluid communication with the internal cavity.

The ablation device system may include any one or more of the features above.

In yet another embodiment, an ablation device includes an electrode platform having at least one electrode positioned thereon, a drive catheter extending from the electrode platform, the drive catheter having at least one lumen, and, at least one vacuum port formed in the electrode platform, the at least one vacuum port in fluid communication with the at least one lumen. The at least one vacuum port and the electrode platform are movable in unison via movement of the drive catheter.

In some embodiments, the at least one vacuum port may include a plurality of vacuum ports arranged about a periphery of the electrode platform. The at least one vacuum port may include a plurality of vacuum ports arranged about a periphery of the at least one electrode. The at least one vacuum port may be surrounded by the at least one electrode. The at least one vacuum port may include a plurality of vacuum ports surrounded by the at least one electrode.

In some embodiments, a vacuum port of the at least one vacuum port may be circular. A vacuum port of the at least one vacuum port may have a diameter of 1.0 to 1.5 mm, or less. A vacuum port of the at least one vacuum port may be square. A vacuum port of the at least one vacuum port may have a maximum dimension of 1.0 to 1.5 mm, or less. A vacuum port of the at least one vacuum port may be rectangular. A vacuum port of the at least one vacuum port may have a maximum width of 1.0 to 1.5 mm, or less. A vacuum port of the at least one vacuum port may be a longitudinal slot extending along a length of the at least one electrode. A width of the longitudinal slot may be between 1.0 to 1.5 mm, or less. A vacuum port of the at least one vacuum port may be a transverse slot extending along a width of the at least one electrode. A width of the transverse slot may be between 1.0 to 1.5 mm, or less. A vacuum port of the at least one vacuum port may include a longitudinal slot extending along a length of the at least one electrode, and a transverse slot extending along a width of the at least one electrode. A width of the longitudinal slot and the transverse slot may be between 1.0 to 1.5 mm, or less.

In some embodiments, at least one wire extends from the at least one electrode through a lumen of the at least one lumen. A first lumen of the at least one lumen may be in fluid communication with a first vacuum port of the at least one vacuum port, and a second lumen of the at least one lumen may be in fluid communication with a second vacuum port of the at least one vacuum port. The electrode platform may include an internal cavity, the at least one vacuum port being in fluid communication with the at least one lumen through the internal cavity.

In some embodiments, the ablation device further includes a body having a lumen for receiving a distal end of an endoscope, wherein the at least one vacuum port and the electrode platform are movable relative to the body in unison via movement of the drive catheter.

In some embodiments, the ablation device further includes a cover portion extending from a side of the body, the cover portion defining a recess between the cover portion and the body, wherein the electrode platform is movable between a covered position, where the at least one electrode is covered by the cover portion, and an exposed position, where the at least one electrode is at least partially exposed beyond the cover portion.

The ablation device may include any one or more of the features above.

Other systems, methods, features and advantages of the described embodiments will be, or will become, apparent to one with skill in the art upon examination of the following figures and detailed description. It is intended that all such additional systems, methods, features and advantages be within the scope of the disclosure, and be encompassed by the following claims.

BRIEF DESCRIPTION OF THE DRAWINGS

The embodiments can be better understood with reference to the following drawings and description. The components in the figures are not necessarily to scale, emphasis instead being placed upon illustrating the principles of the disclosure. Moreover, in the figures, like referenced numerals designate corresponding parts throughout the different views.

DETAILED DESCRIPTION

Figure 1:
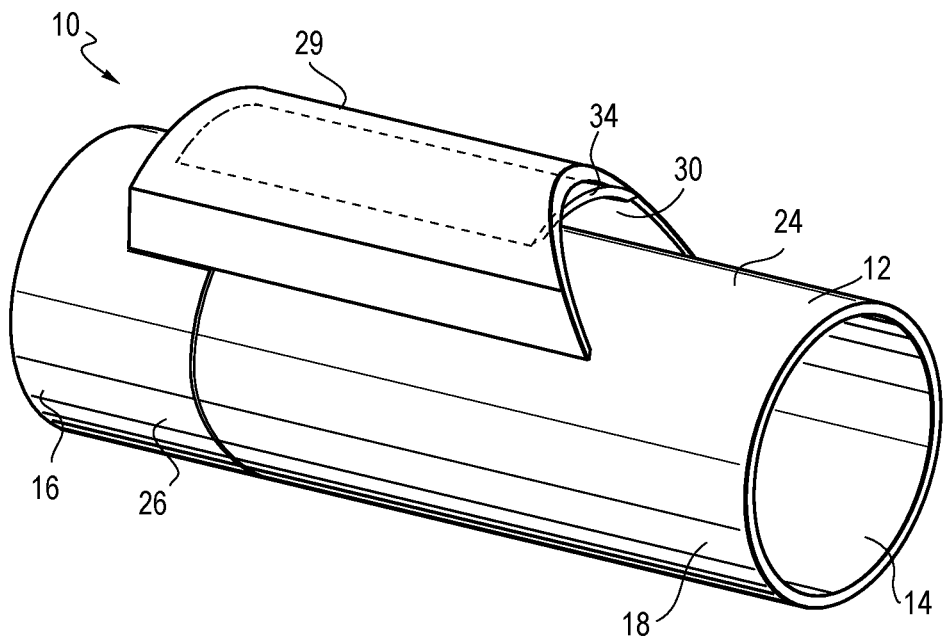
FIG. 1 is a perspective view of an ablation cap with an electrode platform in a covered position, in accordance with an embodiment of the present disclosure.

In the present application, the term "proximal" refers to a direction that is generally towards a physician during a medical procedure, while the term "distal" refers to a direction that is generally towards a target site within a patient's anatomy during a medical procedure. As used herein to describe example embodiments, the term "fluid" may refer to a gas or a liquid.

FIGS. 1-6 illustrate an embodiment of an ablation cap 10 in accordance with the present disclosure. As shown, the ablation cap 10 includes a tubular body 12 having a lumen 14 formed therein. The ablation cap 10 includes a proximal portion 16 and a distal portion 18. As shown in, the proximal portion 16 of the cap 10 is sized to fit on a distal end 20 of an endoscope 22 (shown in FIG. 11). In some embodiments, the proximal portion 16 of the ablation cap 10 may include a flexible portion 26 that is connected to the tubular body 12 and that fits over the distal end 20 of the endoscope 22 to secure the cap 10 to the endoscope 22, for example, by friction fit. In some embodiments, the proximal portion 16 may be made of a hard material that is sized and shaped to fit over the distal end 20 of the endoscope 22 by friction fit.

Figure 6:
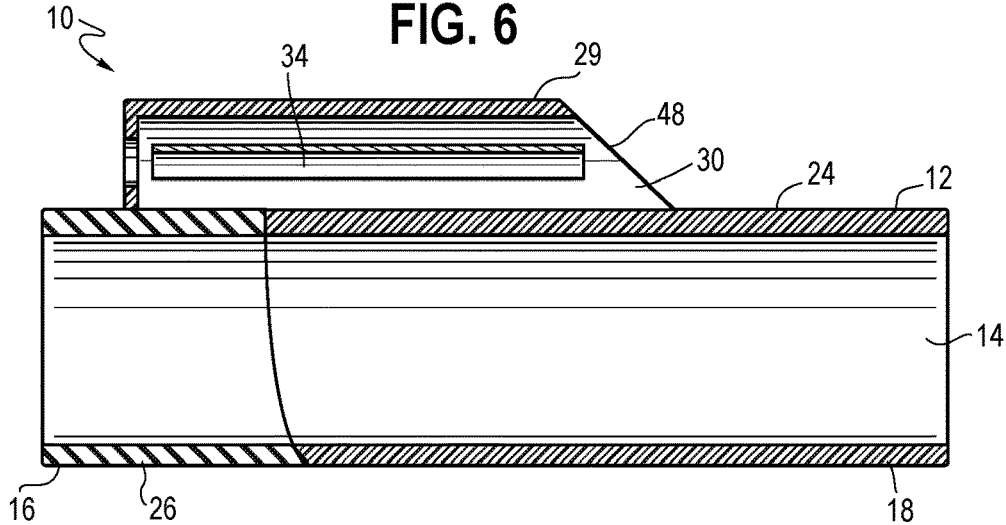
FIG. 6 is a cross-sectional side view of the ablation cap shown in FIG. 1, with the electrode platform in a covered position, taken along line 6-6 in FIG. 4.

The distal portion 18 of the ablation cap 10 may extend beyond the distal end 20 of the endoscope 22. The distal portion 18 may be cylindrical. In some embodiments, the distal portion 18 may be formed from a material having sufficient transparency so that the operator using an imaging device 100 of the endoscope 22 may observe a portion of the tissue to be treated by viewing the tissue through a wall 24 of the distal portion 18 of the ablation cap 10. The distal portion 18 may also include a portion that is formed from a material for magnifying the tissue under observation. The cap 10 may further include a hood or a cover portion 29 that includes a recess 30 formed as part of the ablation cap 10. The cover portion 29 may be integrally formed with the cap 10 or provided as a separate portion and connected to the cap 10. The cover portion 29 is at least partially spaced apart from the tubular body to form the recess 30. The recess 30 may be sized and shaped to hold an extendable electrode platform 34 within the recess 30 in a covered position, as shown in FIGS. 1 and 6. The electrode platform 34 is slidably positionable within the recess 30 of the cover portion 29. In some embodiments, the electrode platform 34 may be positioned entirely within the recess 30 of the cover portion 29 in the covered position so that electrodes positioned on the electrode platform 34 are completely covered.

Figure 2:
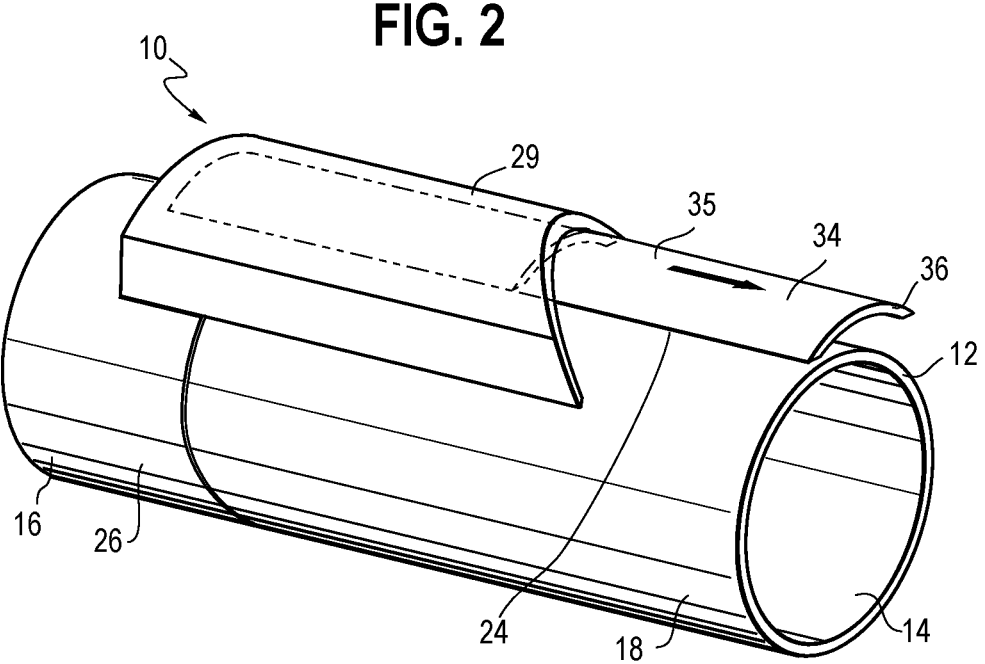
FIG. 2 is a perspective view of the ablation cap shown in FIG. 1, with the electrode platform in an extended position.
Figure 3:
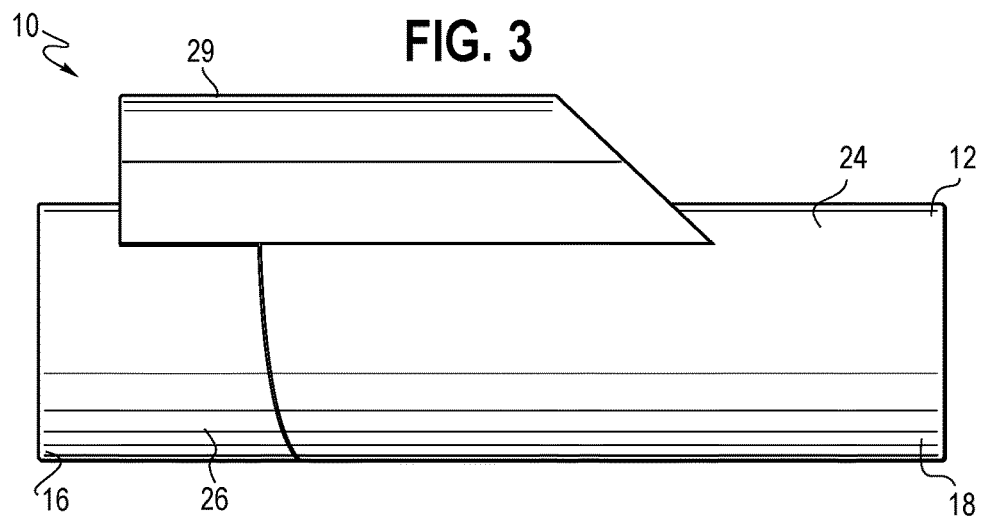
FIG. 3 is a side view of the ablation cap shown in FIG. 1.
Figure 4:
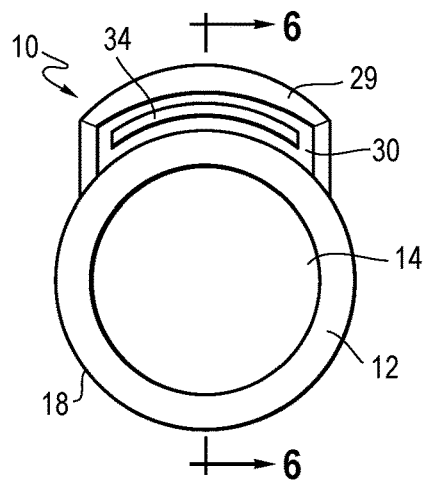
FIG. 4 is an front view the ablation cap shown in FIG. 1.
Figure 5:
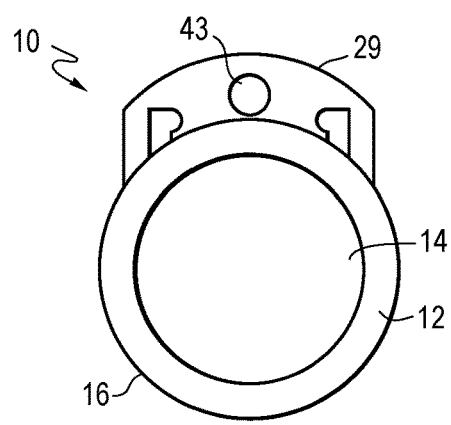
FIG. 5 is a rear view of the ablation cap shown in FIG. 1.

As shown in FIG. 2, the electrode platform 34 may be extended distally from the recess 30 so that at least a portion of a surface 35 of the electrode platform is exposed and can contact the tissue to be treated. A portion of the wall 24 is positioned behind the electrode platform 34 when the electrode platform 34 is an exposed position and may be used to support the electrode platform 34 when the electrode platform 34 is pressed against the tissue to be treated. In some embodiments, a distal end 36 of the electrode platform 34 does not extend beyond a distal end of the distal portion 18 of the cap 10.

In some embodiments, a distal end 36 of the electrode platform 34 is extended less than the extension as shown in FIG. 2. By way of non-limiting example, the distal end 36 may be extended less than 100% or about 20%, 40%, 60% and 80% of the extension shown in FIG. 2. Other extension distances are also possible. In some embodiments, the electrode platform 34 may be colored to facilitate viewing the electrode platform 34 as it is advanced distally and to determine the amount that the electrode platform 34 has been extended. For example, the electrode platform 34 may be black or blue or any color that may be seen through an endoscope to help viewing the position of the electrode platform 34. In some embodiments, the cap 10 may include a stop to stop the electrode platform 34 at a maximum extension and to prevent the electrode platform from extending too far out of the cap 10.

In some embodiments, at least a portion of the electrode platform 34 may be viewable through the endoscope. The electrode platform 34 may move into and out of the view of the endoscope, for example, when the electrode platform 34 has been extended a certain percent relative to the cap 10, the electrode platform 34 may be viewed through the endoscope. By way of non-limiting example, the electrode platform 34 may be viewed when 10%, 20%, 30%, 40%, 50%, 60%, 70%, 80%, 90%, 100% or other amount has been extended distally from the retracted position of FIG. 1. Electrodes positioned on the electrode platform 34 may also be energized when the electrode platform 34 is extended distally less than 100%.

A cross-sectional side view of the ablation cap 10 is shown in FIG. 6. The lumen 14 extends through the ablation cap 10 between the proximal portion 16 and the distal portion 18. The electrode platform 34 is shown within the recess 30 of the cover portion 29. In the embodiment shown, a beveled portion 48 is positioned on a distal edge of the recess 30. The beveled portion 48 may be used to help prevent tissue entrapment within the recess 30, for example, by scraping ablated tissue off the electrode platform 34, when the electrode platform 34 is retracted in a proximal direction, to a position within the cover portion 29.

Figure 7:
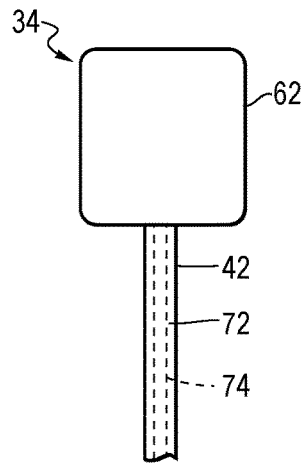
FIG. 7 is a partial view of an embodiment of a support member of the ablation cap.
Figure 8:
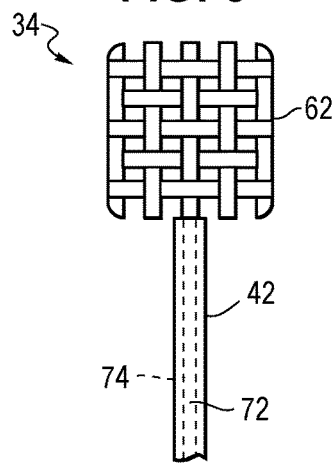
FIG. 8 is a partial view of an embodiment of a support member of the ablation cap.

As shown in FIGS. 7 and 8, the electrode platform 34 may be connected to a drive catheter 42 that extends proximally from the electrode platform 34, through an opening 43 (see FIG. 5) in the rear of the cover portion 39, to a proximal control handle (not shown). The drive catheter 42 is distally movable to extend the electrode platform 34 from the recess 30 of the cover portion 29 and proximally movable to re-position the electrode platform 34 within the recess 30. Typically, the electrode platform 34 is positioned within the recess 30 of the cover portion 29 when the ablation cap 10 is being delivered to a treatment site or being repositioned within a patient's lumen for additional treatment at one or more additional sites. Positioning of the electrode platform 34 within the recess 30 also helps to prevent accidental energy delivery, for example to healthy tissue. The electrode platform 34 is at least partially distally extended from the recess 30 of the cover portion 29 for treatment at a site and energy is delivered to the tissue to ablate the diseased tissue as described in more detail below.

In some embodiments, the electrode platform 34 may include a support member 62 upon which one or more electrodes 64 are positioned. FIGS. 7 and 8 illustrate exemplary support members 62. As shown in FIG. 7, the support member 62 may be a solid material, such as a plastic material. As shown in FIG. 8, the support member 62, may be a mesh. When the solid material or the mesh is formed of a metallic material, a layer of insulation may be provided between the support member 62 and the electrodes 64. The support member 62 may be moved proximally and distally with the drive catheter 42. The electrodes 64 may be secured to the support member 62 by any method known to one skilled in the art. By way of non-limiting example, the electrodes may be secured by gluing, bonding, taping, an adhesive backing on the electrodes, crimping, manufacturing the electrodes directly on to the body and the like.

Electrical wires 72 may extend through a lumen 74 of the drive catheter 42 as shown in FIGS. 7 and 8 and connect to the electrodes 64 to supply the energy for ablation. Alternatively, the electrical wires 72 may extend through a lumen of the endoscope 22. Exemplary electrodes 64 may be seen in FIGS. 8 and 9. The electrodes 64 may be provided separately from the support member 62 and in some embodiments may also form the support member 62 without providing a separate support member.

Figure 9:
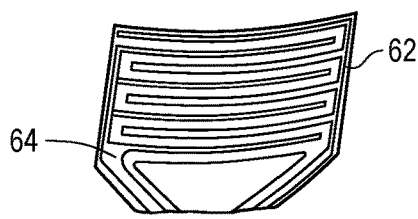
FIG. 9 illustrates an embodiment of an electrode of the ablation cap.
Figure 10:
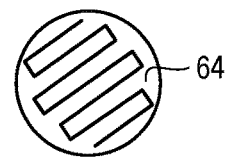
FIG. 10 illustrates an embodiment of an electrode of the ablation cap.

As shown In FIGS. 8 and 9, the electrodes 64 may include positive electrodes 64 and negative electrodes 64 in a bipolar device. When provided as a bipolar device, the electrodes 64 are provided in pairs, one positive and one negative electrode per pair. The electrodes 64 may also be provided as a monopolar device having a single electrode 64 or a plurality of electrodes 64 with a grounding pad or an impedance circuit additionally provided (not shown). The electrodes 64 may be provided in any pattern on the support member 62. The electrodes 64 may cover the entire support member 64 or a portion thereof. By way of non-limiting example, a space 62 between the positive electrode 64 and the negative electrode 64 may between about 0.1 mm to about 5 mm. In some embodiments, the energy may be delivered to the tissue for a period of time from about 0.1 second to about 10 seconds. In some embodiments, the amount of energy delivered to the tissue may be from about 10 watts to about 60 watts. Other spacing distances between electrodes, length of time, and energy delivery are also possible and depend on the target tissue, the depth of the lesion, the type of energy, the length of application of the energy to the tissue and the spacing of the electrodes.

The electrodes 64 are operably connected to an energy source (not shown). In some embodiments, the energy source may be a radio frequency source. However, other types of energy sources may also be used to provide energy to the electrodes. By way of non-limiting example, additional possible energy sources may include microwave, ultraviolet, cryogenic and laser energies.

In some embodiments, the ablation cap may be made primarily of a substantially transparent or translucent polymer such as polytetrafluorothylene (PTFE). Additional possible materials include, but are not limited to the following, polyethylene ether ketone (PEEK), fluorinated ethylene propylene (FEP), perfluoroalkoxy polymer resin (PFA), polyamide, polyurethane, high density or low density polyethylene, and nylon. In some embodiments, the ablation cap may be formed from a lubricious material such as PTFE and the like for easy slidability within the patient's lumen for delivery to the treatment site. In some embodiments, the ablation cap or a portion thereof may be formed from magnifying or other image enhancing materials. The ablation cap or a portion thereof may also be coated or impregnated with other compounds and materials to achieve the desired properties. Exemplary coatings or additives include, but are not limited to, parylene, glass fillers, silicone hydrogel polymers and hydrophilic coatings.

Figure 11:
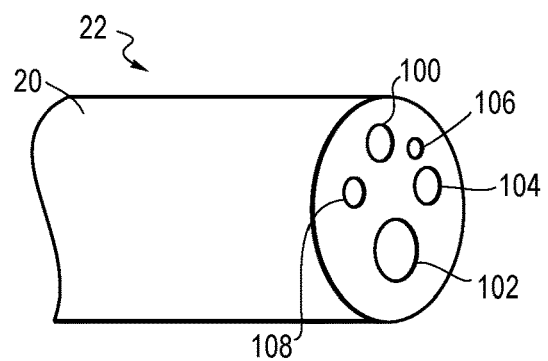
FIG. 11 illustrates the distal end of an exemplary endoscope for use with the ablation caps of the present disclosure.
Figure 12:
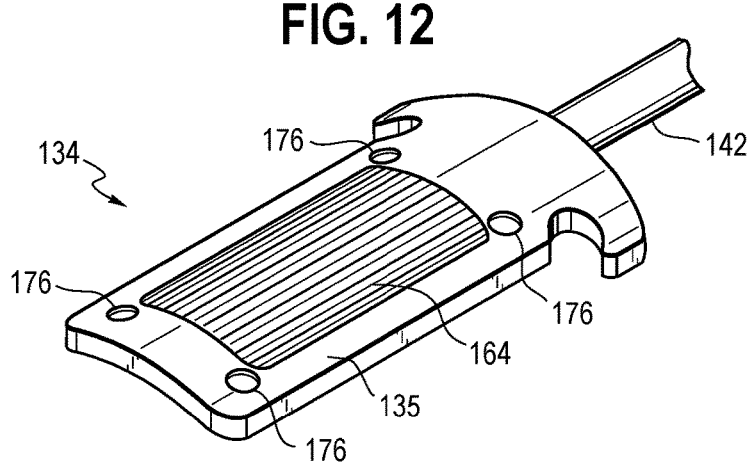
FIG. 12 is a perspective view of an electrode platform and drive catheter, in accordance with an embodiment of the present disclosure.
Figure 13:
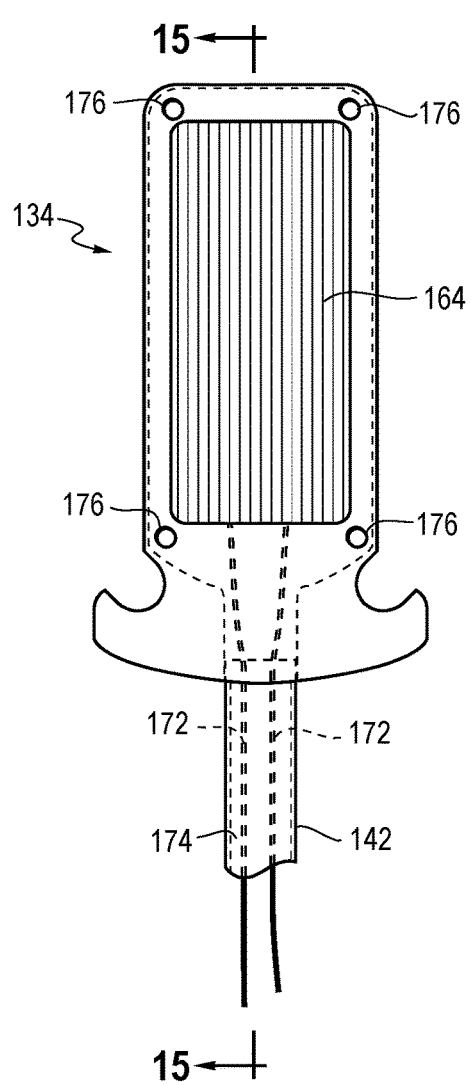
FIG. 13 is a top view of the electrode platform and drive catheter shown in FIG. 12.
Figure 14:
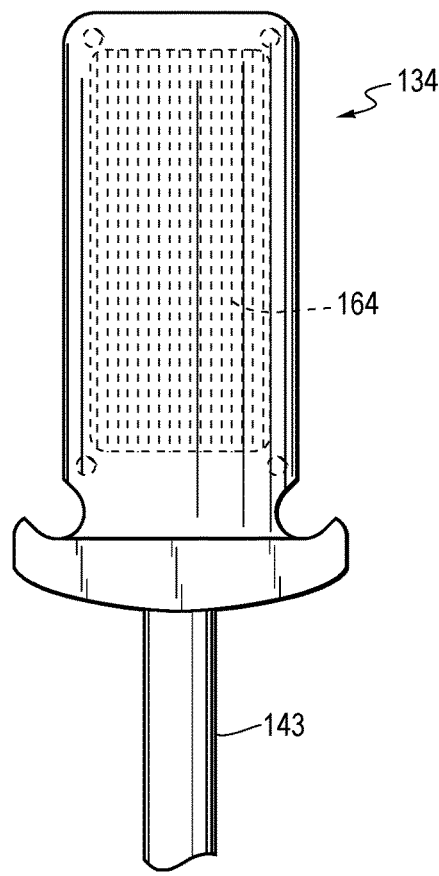
FIG. 14 is a bottom view of the electrode platform and drive catheter shown in FIG. 12.

FIG. 11 illustrates the distal end 20 of an exemplary endoscope 22 for use with the ablation caps of the present disclosure. In some embodiments, the endoscope 22 may include an imaging device 100 extending through at least a portion of endoscope 22 between a proximal end of the endoscope 22 and the distal end 20. The imaging device 100 may include a lens operatively coupled to, e.g., in signal communication with, an external imaging system and is configured to capture images of the target site and transmit signals indicative of the captured images to the imaging system. The endoscope 22 may also include an accessory channel 102 extending through at least a portion of the endoscope 20 between a proximal end of the endoscope 22 and the distal end 20. The accessory channel 102 may be used to delivery any number of accessories or devices, such as a catheter (not shown), to the distal end 22 of the endoscope 20. Endoscope 22 may further include one or more light sources 104, such as light-emitting diodes (LEDs), and a water source 106 configured to inject water into the target site. Finally, the endoscope 22 may include one or more fluid lumens 108 extending through at least a portion of the endoscope 20 between a proximal end of the endoscope 22 and the distal end 20. The one or more fluid lumens 108 may be in fluid communication with an external source of a pressurized fluid (e.g., gas such as carbon dioxide or a liquid) to aerate the target site. Alternatively, or additionally, the one or more fluid lumens 108 may be in fluid communication with a vacuum pump to withdraw fluid from the target site and/or to supply a suction force within the cap 10 in order to draw the tissue to be ablated into contact with the electrodes 64.

FIGS. 12-22 illustrate additional electrode platforms and drive catheters in accordance with additional embodiments of the present disclosure. The electrode platforms and drive catheters of FIGS. 12-22 may be used in conjunction with the ablation cap 10 of FIGS. 1-6, or other ablation caps, and/or in conjunction with the endoscope 22 of FIG. 11, or other endoscopes. The structure of the electrode platform 134 and drive catheter 142 of FIGS. 12-15 is exemplary of the structures of the electrode platforms 234, 334, 434, and 534 illustrated in FIGS. 16-22, except as described below.

Similar to prior embodiments, FIGS. 12-15 illustrate an electrode platform 134 having one or more electrodes 164 arranged in a central portion of the electrode platform 134. A drive catheter 142 defining a central lumen 174 extends proximally from the electrode platform 134. The drive catheter 142 may be movable distally to extend the electrode platform 134 from the recess 30 of the cover portion 29 and movable proximally to re-position the electrode platform 134 within the recess 30. Electrical wires 172 may extend through the lumen 174 of the drive catheter 142 and connect to the electrodes 164 to supply the energy for ablation.

Unlike prior embodiments, the electrode platform 134 comprises one or more vacuum ports 176 formed on the surface 135 of the electrode platform 134. The vacuum ports 176 extend through the surface 135 and are in fluid communication with a central cavity 178 of the electrode platform 134, as illustrated in the cross-sectional view of FIG. 15. In turn, the central cavity 178 is in fluid communication with the central lumen 174 of the drive catheter 142. The central lumen 174 may be in fluid communication with a vacuum pump (not shown) positioned at a proximal end of the drive catheter 174. In this way, the one or more vacuum ports 176 may be used to selectively supply a suction force to draw tissue in the vicinity of the of the electrode platform 134 toward the one or more electrodes 164, without relying on the fluid port 108 of the endoscope 22.

In the embodiment of FIGS. 12-15, four vacuum ports 176 are arranged about the periphery of the electrode platform 134, and about the periphery of the one or more electrodes 164, in a generally rectangular orientation. In some embodiments, the electrode platform may have fewer than four vacuum ports 176, or more than four vacuum ports 176. In some embodiments, the vacuum ports 176 may be circular, and have a diameter of 1.0 to 1.5 mm, or less. In other embodiments, the vacuum ports 176 may have other shapes, such as a square, a rectangle, or other elongated shape. In general, however, the vacuum ports 176 will be sized so that no significant amount of ablated and/or loose tissue will be drawn into the vacuum ports 176, where such tissue may build-up and/or clog the cavity 178 or lumen 174. In general, such openings will have a dimension (e.g., diameter, width, etc.) in the range of 1.0 to 1.5 mm, or less.

In the embodiment of FIGS. 12-15, the vacuum ports 176 are arranged about the periphery of the one or more electrodes 164. Advantageously, this orientation does not disrupt the surface of the one or more electrodes 164, thereby maintaining the surface area thereof for ablation of tissue, while still providing a distributed suction force around the periphery of the electrodes 164. Likewise, vacuum ports 176 in the form of multiple small holes or openings distributed about the surface 135 of the electrode platform 134, rather than one or more larger openings, helps maintains the rigidity of the electrode platform 134, thereby facilitating the ability to position the electrode platform 134. In this embodiment, the distributed suction force supplied by the vacuum ports 176, about the periphery of the electrodes 164, effectively draws adjacent tissue uniformly into contact across the entire surface area of the electrodes 164.

Figure 15:
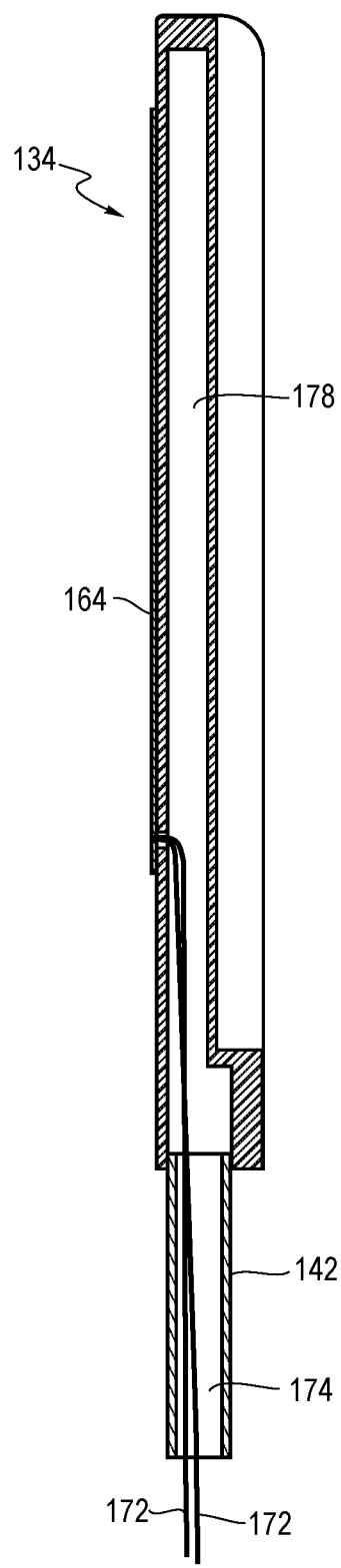
FIG. 15 is a cross-sectional side view of the electrode platform and drive catheter shown in FIG. 12, taken along line 15-15 in FIG. 13.

While the drive catheter 142 and electrode platform 134 of FIG. 15 illustrates a single lumen 174, and a single cavity 178, for communication with a vacuum pump (not shown), and/or an energy source (not shown) via wires 177, in other embodiments, the drive catheter 142 may have multiple separate lumens, in communication with multiple separate cavities and/or vacuum ports 176. For example, the drive catheter 142 may have one lumen for housing the wires 177, a second lumen in communication with a cavity and one or more select vacuum ports 176, and a third lumen in communication with another cavity and one or more other vacuum ports 176, where the second and third lumens are also selectively in communication with one or more vacuum pumps. In this way, a suction force may be selectively delivered to one or more of the vacuum ports 176, as desired, or all of the vacuum ports 176. In some embodiments, the one or more vacuum ports 176 may be monitored, individually or collectively, to determine if adequate contact is achieved between the electrode platform 134 (and one or more electrodes 164 mounted thereon) and target tissue site. For example, the one or more vacuum ports 176 may be individually or collectively monitored to determine if a negative pressure is created and maintained within the one or more lumens 174 and/or cavities 178, thereby indicating contact between the target tissue and the electrode platform 134, at least in the region of the individual vacuum ports 176.

Additionally, or alternatively, in some embodiments, the one or more vacuum ports 176 (and related cavities and lumens) may be in communication with a source of pressurized fluid (e.g., carbon dioxide, or saline solution), for purposes of flushing the lumen 174, cavity 178, and/or vacuum ports 176, for example, to expel ablated tissue. The pressurized fluid may also serve to "rinse" the surface 135 of the electrode platform 134, for example, to assist the release of ablated tissue from the surface 135.

Figure 16:
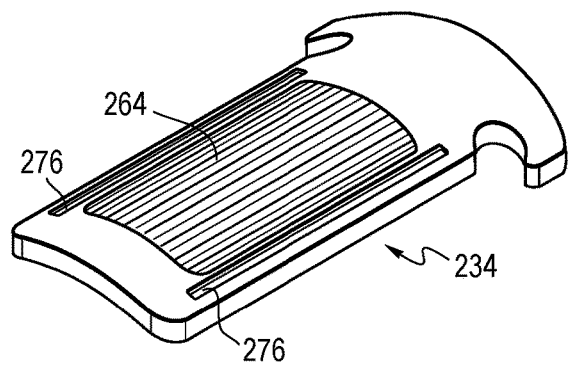
FIG. 16 is a perspective view of another electrode platform, in accordance with an embodiment of the present disclosure.
Figure 17:
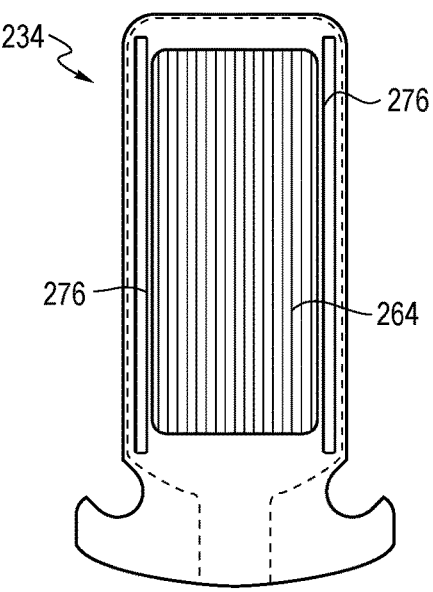
FIG. 17 is a top view of the electrode platform shown in FIG. 16.

FIGS. 16-17 illustrate an electrode platform 234 according to another embodiment of the present disclosure. In the embodiment of FIGS. 16-17, one or more vacuum ports 276 are arranged along the lateral edges of one or more electrodes 264. In some embodiments, the vacuum ports 276 may be formed as longitudinal slots, having a length corresponding to a length of the electrodes 234, and a width of 1.0 to 1.5 mm, or less. In other embodiments, the length of the longitudinal slots may be greater than or less than the length of the electrodes 234. Advantageously, this orientation does not disrupt the surface of the one or more electrodes 264, thereby maintaining the surface area thereof for ablation of tissue, while still providing a distributed suction force along the entire length and lateral edges of the one or more electrodes 264. In this embodiment, the distributed suction force supplied by the vacuum ports 276, along the lateral edges of the electrodes 264, effectively draws adjacent tissue uniformly into contact across the entire surface area of the electrodes 264.

Figure 18:
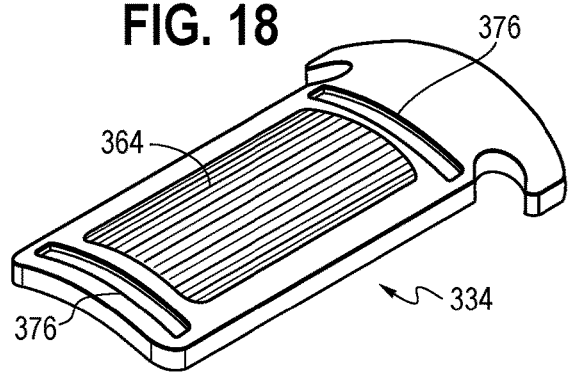
FIG. 18 is a perspective view of another electrode platform, in accordance with an embodiment of the present disclosure.
Figure 19:
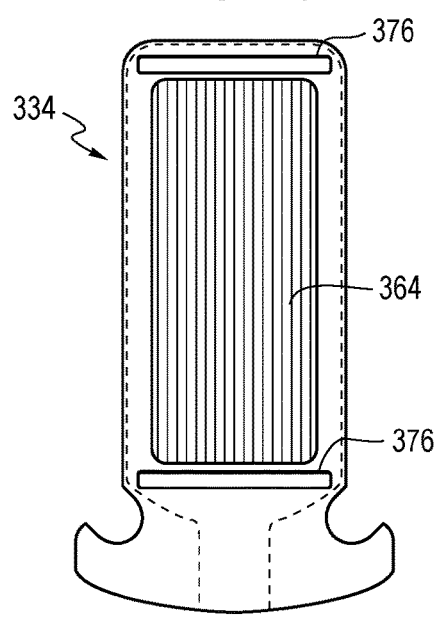
FIG. 19 is a top view of the electrode platform shown in FIG. 18.

FIGS. 18-19 illustrate an electrode platform 334 according to another embodiment of the present disclosure. In the embodiment of FIGS. 18-19, one or more vacuum ports 376 are arranged along the proximal and distal edges of one or more electrodes 364. In some embodiments, the vacuum ports 376 may be formed as transverse slots, having a length corresponding to a width of the electrodes 334, and a width of 1.0 to 1.5 mm, or less. In other embodiments, the length of the transverse slots may be greater than or less than the width of the electrodes 334. Advantageously, this orientation does not disrupt the surface of the one or more electrodes 364, thereby maintaining the surface area thereof for ablation of tissue, while still providing a distributed suction force along the entire width and proximal and distal edges of the one or more electrodes 364. In this embodiment, the distributed suction force supplied by the vacuum ports 376, along the entire width and proximal and distal edges of the one or more electrodes 364, effectively draws adjacent tissue uniformly into contact across the entire surface area of the electrodes 364.

Figure 20:
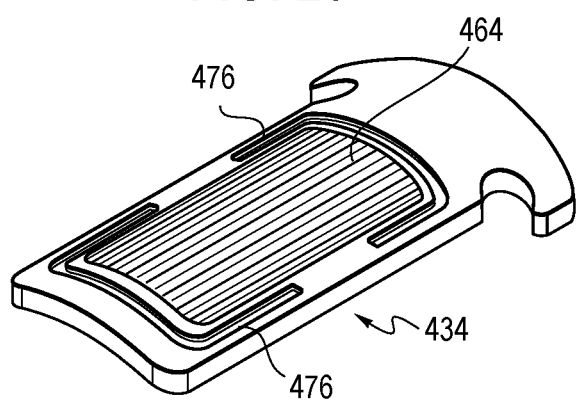
FIG. 20 is a perspective view of another electrode platform, in accordance with an embodiment of the present disclosure.
Figure 21:
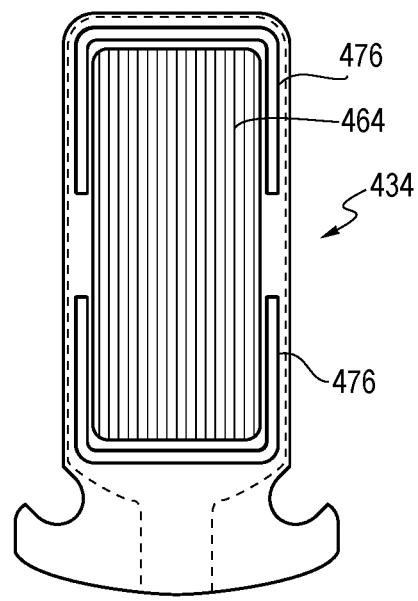
FIG. 21 is a top view of the electrode platform shown in FIG. 20.

FIGS. 20-21 illustrate an electrode platform 434 according to another embodiment of the present disclosure. In the embodiment of FIGS. 20-21, one or more vacuum ports 476 are arranged along the lateral edges, and the proximal and distal edges, of one or more electrodes 464. In some embodiments, the vacuum ports 476 may be formed as slots, having both a longitudinal portion, extending along a portion of the length of the electrodes 464, and a transverse portion, extending along a the width of the electrodes. Again, the slots may have a width of 1.0 to 1.5 mm, or less. In some embodiments, the longitudinal portions of the vacuum ports 476 may extend substantially the length of the electrodes 464. However, it should be appreciated that the entire periphery of the electrodes are not surrounded by the vacuum ports 476, as at least a portion of the surface of the electrode platform 434 must remain to support the electrodes 464. Advantageously, this orientation does not disrupt the surface of the one or more electrodes 464, thereby maintaining the surface area thereof for ablation of tissue, while still providing a distributed suction force along both the length and width, and on all sides of the or more electrodes 464. In this embodiment, the distributed suction force supplied by the vacuum ports 476, along both the length and width of the one or more electrodes 464, effectively draws adjacent tissue uniformly into contact across the entire surface area of the electrodes 464.

Figure 22:
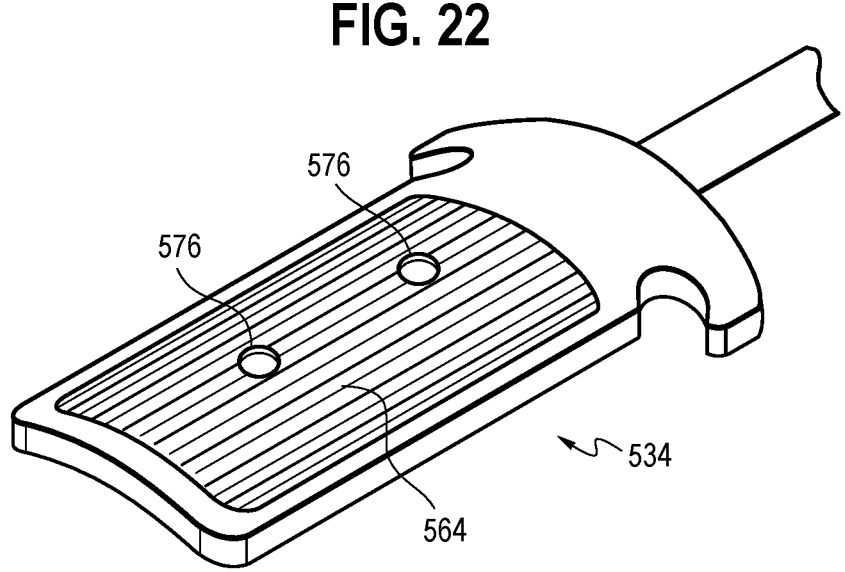
FIG. 22 is a perspective view of another electrode platform, in accordance with an embodiment of the present disclosure.

FIG. 22 illustrates an electrode platform 534 according to another embodiment of the present disclosure. In the embodiment of FIG. 22, one or more vacuum ports 576 are arranged within, or are surrounded by, one or more electrodes 564. In some embodiments, the vacuum ports 576 may be circular, and have a diameter of 1.0 to 1.5 mm, or less. In other embodiments, the vacuum ports 576 may have other shapes, such as a square, a rectangle, or other elongated shape. Advantageously, this orientation provides a distributed suction force originating in multiple locations within, or surrounded by the one or more electrodes 564, thereby drawing tissue to be ablated to a specific locations within the electrodes 564. In this embodiment, a distributed suction force may be supplied by the vacuum ports 576, depending on the location, number, and shape of the vacuum ports 576, to effectively draw adjacent tissue uniformly into contact across the entire surface area of the electrodes 564.

In other embodiments, an electrode platform may have one or more combinations of the orientations of the vacuum ports 176, 276, 376, 476, 576. For example, an electrode platform may have vacuum ports 176 and 576, in the form of circular holes, formed about the periphery of one or more electrodes, and within, or surrounded by, the one or more electrodes. It should be appreciated that the any number of combinations and orientations of vacuum ports may be positioned on an electrode platform without departing from the scope of the present disclosure. The embodiments described and illustrated herein are only exemplary.

Figure 23A:
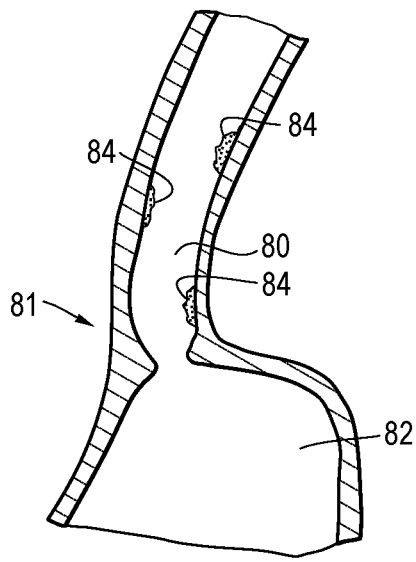
FIGS. 23A-23C illustrate operation of the ablation cap.
Figure 23B:
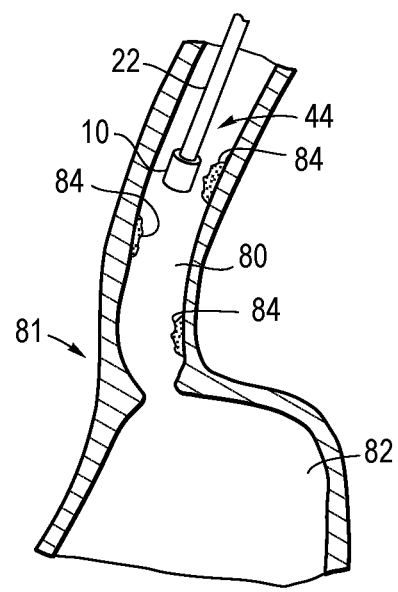
Figure 23C:
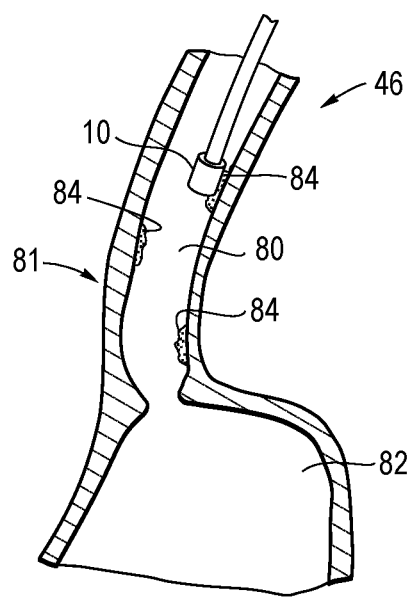

Operation of an ablation device using the endoscope 22, the ablation cap 10, and an electrode platform (e.g., 134, 234, 334, 434, and/or 534) of the present disclosure as a non-limiting example will be explained with reference to FIGS. 23A-C. FIG. 23A illustrates a patient's esophagus 80, lower esophageal sphincter (LES) 81 and stomach 82. Areas of diseased tissue 84 within the esophagus 80 are also shown. The diseased tissue 84 may be columnar mucosa (Barrett's esophagus) that is to be ablated using the ablation cap 10. FIG. 23B illustrates the ablation cap 10 positioned on the distal end 20 of the endoscope 22 and the cap 10 and the endoscope 22 being inserted into the patient's esophagus 80. The ablation cap 10 is positioned in the esophagus 80 near the portion of the diseased tissue 84 to be treated. The insertion of the ablation cap 10 may be monitored using the imaging device 100 of the endoscope 22 to help position the cap 10 at the diseased tissue. As shown in FIG. 23B, the ablation cap 10 is positioned near the diseased tissue 84. While the ablation cap 10 is being positioned, the electrode platform (e.g., 134, 234, 334, 434, and/or 534) is in a covered position 44 within the ablation cap 10. Then, when the ablation cap 10 is in the desired position, the electrode platform may be advanced distally from the cap 10 to an exposed position 46. Once in an exposed position 46, a suction force may be selectively delivered from a vacuum source to one or more vacuum ports (e.g., 176, 276, 376, 476, and/or 576) on the electrode platform to draw nearby tissue in to contact with the electrodes on the electrode platform, as shown in FIG. 23C. Advantageously, this step may also be may be monitored using the imaging device 100 of the endoscope 22 to help ensure that the target tissue (and not healthy tissue) is in the desired contact with the electrode platform. When the diseased tissue 84 is in sufficient contact with the electrode platform 34, the electrodes 64 are in contact with the diseased tissue 84 and can deliver energy to the diseased tissue 84 to ablate the diseased tissue 84. A power source (not shown) is activated for a sufficient time to ablate the diseased tissue 84. The ablation cap 10 may then be repositioned near another portion of diseased tissue 84 for treatment and the steps repeated as many times as needed. The electrode platform 34 may be extended and viewed through the imaging device 100 as the electrode platform 34 extends distally. When necessary, a fluid from a fluid source may be delivered to the one or more vacuum ports to flush the vacuum ports and/or "rinse" the surface of the electrode platform. While the procedure has been described with reference to the ablation of diseased tissue in the esophagus using the ablation cap 10, the location of the treatment is not limited to the esophagus. By way of non-limiting example, portions of the stomach, or the gastrointestinal tract may also be treated using the ablation cap 10.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

One skilled in the art will realize that a virtually unlimited number of variations to the above descriptions are possible, and that the examples and the accompanying figures are merely to illustrate one or more examples of implementations.

It will be understood by those skilled in the art that various other modifications can be made, and equivalents can be substituted, without departing from claimed subject matter. Additionally, many modifications can be made to adapt a particular situation to the teachings of claimed subject matter without departing from the central concept described herein. Therefore, it is intended that claimed subject matter not be limited to the particular embodiments disclosed, but that such claimed subject matter can also include all embodiments falling within the scope of the appended claims, and equivalents thereof.

In the detailed description above, numerous specific details are set forth to provide a thorough understanding of claimed subject matter. However, it will be understood by those skilled in the art that claimed subject matter can be practiced without these specific details. In other instances, methods, devices, or systems that would be known by one of ordinary skill have not been described in detail so as not to obscure claimed subject matter.

Reference throughout this specification to "one embodiment" or "an embodiment" can mean that a particular feature, structure, or characteristic described in connection with a particular embodiment can be included in at least one embodiment of claimed subject matter. Thus, appearances of the phrase "in one embodiment" or "an embodiment" in various places throughout this specification are not necessarily intended to refer to the same embodiment or to any one particular embodiment described. Furthermore, it is to be understood that particular features, structures, or characteristics described can be combined in various ways in one or more embodiments. In general, of course, these and other issues can vary with the particular context of usage. Therefore, the particular context of the description or the usage of these terms can provide helpful guidance regarding inferences to be drawn for that context.

The invention claimed is:

1. An ablation device comprising:
    a body having a lumen for receiving a distal end of an endoscope;
    a cover portion extending from a side of the body, the cover portion defining a recess between the cover portion and the body;
    an electrode platform having a treatment surface with at least one electrode positioned thereon, the electrode platform movable between a covered position, where the at least one electrode is covered by the cover portion, and an exposed position, where the at least one electrode is at least partially exposed beyond the cover portion; and,
    at least one vacuum port formed in the electrode platform, wherein the at least one vacuum port is arranged about a periphery of the at least one electrode;
    wherein the at least one electrode and the at least one vacuum port are positioned on the treatment surface of the electrode platform.

2. The ablation device of claim 1, wherein the at least one vacuum port is arranged at a peripheral edge of the at least one electrode.

3. The ablation device of claim 1, wherein a vacuum port of the at least one vacuum port is a longitudinal slot extending along a length of the at least one electrode.

4. The ablation device of claim 3, wherein a width of the longitudinal slot is less than 1.5 mm.

5. The ablation device of claim 1, wherein a vacuum port of the at least one vacuum port is a transverse slot extending along a width of the at least one electrode.

6. The ablation device of claim 5, wherein a width of the transverse slot is less than 1.5 mm.

7. The ablation device of claim 1, wherein a vacuum port of the at least one vacuum port comprises a longitudinal slot extending along a length of the at least one electrode, and a transverse slot extending along a width of the at least one electrode.

8. The ablation device of claim 7, wherein a width of the longitudinal slot and the transverse slot is less than 1.5 mm.

9. An ablation device system comprising:
    an endoscope comprising:
        an imaging device for capturing images at a distal end of the endoscope;
        one or more fluid lumens extending through at least a portion of the endoscope between a proximal end of the endoscope and the distal end; and,
    an ablation cap comprising:
        a body having a lumen for receiving the distal end of the endoscope;
        a cover portion extending from a side of the body, the cover portion defining a recess between the cover portion and the body;
        an electrode platform having a treatment surface with at least one electrode positioned thereon, the electrode platform movable between a covered position, where the at least one electrode is covered by the cover portion, and an exposed position,
        where the at least one electrode is at least partially exposed beyond the cover portion; and,
    at least one vacuum port formed in the electrode platform, wherein the at least one vacuum port is arranged about a periphery of the at least one electrode;
        wherein the at least one electrode and the at least one vacuum port are positioned on the treatment surface of the electrode platform.

10. The ablation device system of claim 9, further comprising at least one vacuum pump, wherein the at least one vacuum port formed in the electrode platform of the ablation cap and the one or more fluid lumens of the endoscope are in fluid communication with the at least one vacuum pump.

11. The ablation device system of claim 10, wherein the at least one vacuum pump may supply a suction force to the at least one vacuum port formed in the electrode platform of the ablation cap independent of a suction force supplied to the one or more fluid lumens of the endoscope.

12. The ablation device system of claim 9, further comprising a drive catheter extending proximally from the electrode platform.

13. The ablation device system of claim 12, wherein the drive catheter comprises at least one lumen.

14. The ablation device system of claim 13, wherein at least one wire extends from the at least one electrode through a lumen of the at least one lumen.

15. The ablation device system of claim 13, where a first lumen of the at least one lumen is in fluid communication with a first vacuum port of the at least one vacuum port, and a second lumen of the at least one lumen is in fluid communication with a second vacuum port of the at least one vacuum port.

16. The ablation device system of claim 9, wherein the electrode platform comprises an internal cavity, the at least one vacuum port being in fluid communication with the internal cavity.

17. The ablation device system of claim 16, further comprising a drive catheter extending proximally from the electrode platform, the drive catheter having at least one lumen in fluid communication with the internal cavity.

18. An ablation device comprising:
an electrode platform having a treatment surface with at least one electrode positioned thereon;
a drive catheter extending from the electrode platform, the drive catheter having at least one lumen; and,
at least one vacuum port formed in the electrode platform, the at least one vacuum port in fluid communication with the at least one lumen, wherein the at least one vacuum port is arranged about a periphery of the at least one electrode;
wherein the at least one electrode and the at least one vacuum port are positioned on the treatment surface of the electrode platform; and,
wherein the at least one vacuum port and the electrode platform are movable in unison via movement of the drive catheter.

19. The ablation device of claim 18, further comprising:
a body having a lumen for receiving a distal end of an endoscope;
wherein the at least one vacuum port and the electrode platform are movable relative to the body in unison via movement of the drive catheter.

20. The ablation device of claim 19, further comprising:
a cover portion extending from a side of the body, the cover portion defining a recess between the cover portion and the body;
wherein the electrode platform is movable between a covered position, where the at least one electrode is covered by the cover portion, and an exposed position, where the at least one electrode is at least partially exposed beyond the cover portion.

* * * * *